United States Patent [19]

Wright

[11] Patent Number: 4,563,279

[45] Date of Patent: Jan. 7, 1986

[54] SPIRAL SEPARATORS

[76] Inventor: Douglas C. Wright, 'Hibiscus Grove', Terranora Rd., Terranora, New South Wales, Australia, 2485

[21] Appl. No.: 681,708

[22] Filed: Dec. 13, 1984

Related U.S. Application Data

[63] Continuation of Ser. No. 629,744, Jul. 10, 1984, abandoned, which is a continuation of Ser. No. 391,932, Jun. 24, 1982, abandoned.

[30] Foreign Application Priority Data

Jul. 3, 1981 [AU] Australia .............................. PE9589

[51] Int. Cl.[4] .......................... B01D 21/26; B03B 5/52

[52] U.S. Cl. ................................. 210/512.1; 210/787; 209/459; 209/697

[58] Field of Search ............... 210/252, 261, 262, 322, 210/512.1, 512.2, 787, 788, 304, 299; 209/211, 459, 493, 696, 697

[56] References Cited

U.S. PATENT DOCUMENTS

| | | | |
|---|---|---|---|
| 629,590 | 7/1899 | Pardee | 209/697 |
| 923,988 | 6/1909 | Mullen | 209/493 |
| 1,040,374 | 10/1912 | Middleton et al. | 209/497 |
| 1,462,618 | 6/1923 | Pardee | 209/697 |
| 1,698,101 | 1/1929 | Martling | 209/211 |
| 1,880,185 | 9/1932 | Kerns et al. | 209/211 |
| 2,425,110 | 8/1947 | McCurdy | 210/512.1 |
| 2,431,559 | 11/1947 | Humphreys | 209/211 |
| 2,431,560 | 11/1947 | Humphreys | 209/211 |
| 2,615,572 | 10/1952 | Hodge | 209/211 |
| 2,700,469 | 1/1955 | Humphreys | 209/211 |
| 3,099,621 | 7/1963 | Close | 209/459 |
| 3,319,788 | 5/1967 | Reichert | 209/493 |
| 3,371,784 | 3/1968 | Conway | 209/458 |
| 3,568,832 | 3/1971 | Persson | 209/459 |
| 3,891,546 | 6/1975 | Humphreys | 209/211 |
| 3,910,835 | 10/1975 | Stafford | 209/115 |
| 4,059,506 | 11/1977 | Bryson | 209/211 |
| 4,142,965 | 3/1979 | Dolan | 209/487 |
| 4,146,137 | 3/1979 | Beckhan | 209/112 |
| 4,189,378 | 2/1980 | Wright et al. | 209/459 |
| 4,277,330 | 7/1981 | Wright et al. | 209/459 |
| 4,324,334 | 4/1982 | Wright et al. | 209/459 |
| 4,384,650 | 5/1983 | Wright et al. | 209/459 |
| 4,476,980 | 10/1984 | Giffard | 209/459 |

FOREIGN PATENT DOCUMENTS

| | | | |
|---|---|---|---|
| 5520580 | 8/1980 | Australia . | |
| 7429781 | 8/1981 | Australia . | |
| 6943681 | 11/1981 | Australia . | |
| 1132511 | 7/1962 | Fed. Rep. of Germany . | |
| 2046131 | 11/1980 | United Kingdom | 209/459 |
| 354895 | 11/1972 | U.S.S.R. | 210/232 |

*Primary Examiner*—Richard V. Fisher
*Assistant Examiner*—Wanda L. Millard

[57] ABSTRACT

The invention relates to a spiral separator supported with its axis substantially vertically which is adapted to receive at an upper end thereof a pulp of water and minerals to be separated. The spiral separator includes a plurality of helical turns wherein each turn includes an inner portion and an outer portion. The outer portion is inclined upwardly relative to the inner portion. The invention is characterized in that the inner portion includes a first part and a second part wherein the second part is inclined upwardly relative to the first part at a steeper angle to horizontal than the first part throughout part of the length of the spiral separator. This feature provides a generally non-turbulent or laminar flow of pulp along the said part of the said spiral separator and thereby inhibits sand barring.

16 Claims, 6 Drawing Figures

SPIRAL SEPARATORS

Figure 1:
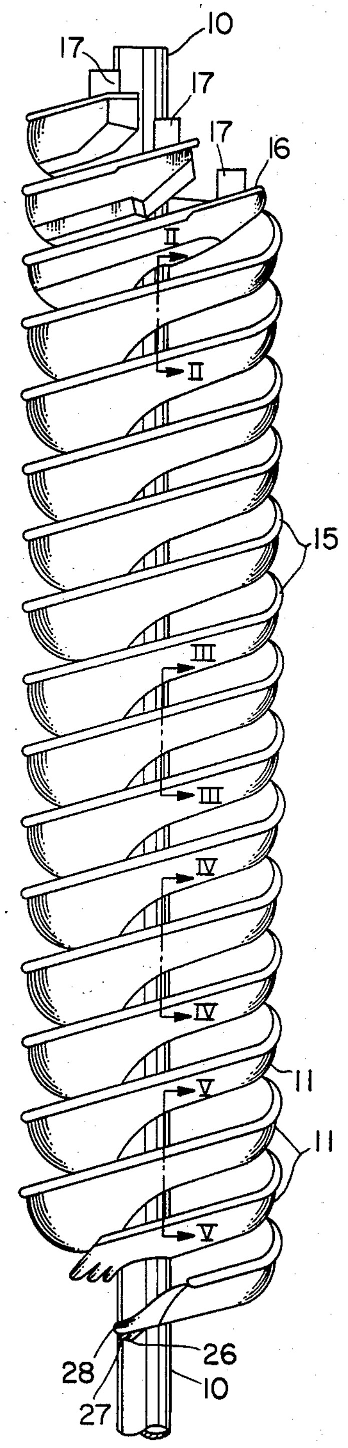

This application is a continuation of application Ser. No. 629,744, filed July 10, 1984, which is a continuation of application Ser. No. 391,932, filed June 24, 1982, both of which are now abandoned.

This invention relates to an improved spiral separator.

Spiral separators for wet separation of minerals are well known, such as a separator consisting of one or more helical sluices or "spirals" mounted on a central column, a pulp or slurry of water and the minerals to be separated being introduced to the head of the separator wherein minerals of higher density or specific gravity tend to travel near to the inner part of the separator, near to its axis, and the less dense minerals tend to travel along the outer part of the spiral so that the pulp may form strata. Take-offs may be provided for drawing off the required minerals which may be separated into concentrates or tailings or concentrates, middlings and tailings.

One type of spiral separator is that described in Australian Patent Specification No. 55205/80. This specification concerns a spiral separator supported with its axis substantially vertical which is adapted to receive at an upper end thereof a pulp of water and minerals to be separated wherein the spiral separator includes a plurality of turns and the bottom of each turn includes a substantially straight or flat portion which is upwardly inclined to horizontal at an angle which progressively decreases from top to bottom throughout part of the length of the separator so as to provide a braking effect on pulp flow.

The abovementioned spiral separator has been found to be generally satisfactory in performance and operation as it may be used to produce a rich concentrate and throw a very substantial final tailing on a single pass of material through the apparatus with a middling cut being taken for reprocessing.

However it has been observed that because the bottom or base wall of each helical sluice or spiral is substantially flat and at an upwardly sloping angle to horizontal that this feature, while providing a satisfactory braking effect on pulp flow, does have the disadvantage that water may flow on the upwardly sloping bottom wall and substantially vertical side wall. This may cause turbulence which adversely affects the desired stratification of the particles in the pulp and thereby inhibiting effective separation of particles. This phenomenon is particularly relevant at low pump densities (e.g. 10-30% of solids by weight of slurry).

One conventional method of increasing the capacity of spiral separators is to increase the number of turns at uniform pitch to give a longer residence time to enable separation of the valuable concentrate mineral from the gauge or tailings at a high feed rate (e.g. 1.7 tons of solids per hour per spiral separator attached to a central column).

Another conventional method of increasing the capacity of spiral separators is to increase the width of the spiral trough.

However, when increasing the width of the spiral trough it will be found that the longitudinal downward slope of the floor of the trough to horizontal at certain radii will become so low or shallow that sand barring may occur. A method usually employed to increase the downward slope of the floor of the spiral trough is to increase the pitch or vertical distance between each turn of the spiral.

For example, in relation to the wide trough and short inner radius of the spiral separator described in patent application No. 55205/80 it will be found that an increase in pitch will result in a high increase in downward slope of the floor of the spiral trough at relatively short radii and will result in an undesirable velocity of the feed or pulp.

Another problem of conventional spiral separators such as those referred to above is of insufficient capacity to operate on an economic basis.

It is therefore an object of this invention to provide a spiral separator which alleviates the abovementioned disadvantages associated with the prior art.

The invention provides a spiral separator supported with its axis substantially vertically which is adapted to receive at an upper end thereof a pulp of water and minerals to be separated. The spiral separator, includes a plurality of helical turns wherein each turn includes an inner portion and an outer portion with the outer portion being inclined upwardly relative to the inner portion. The spiral is further characterized in that said inner portion includes a first part and a second part whereby said second part is inclined upwardly relative to the first part at a steeper angle to horizontal than said first part throughout part of the length of the spiral separator whereby generally non-turbulent or laminar flow of pulp is achieved along said part of the length of the spiral separator and sand barring is inhibited.

The invention is most suitably applied to the invention of Patent Specification No. 55205/80 so that the inner portion has a progressively decreasing angle from top to bottom throughout at least a part of the length so as to achieve the abovementioned braking effect. However, the invention can also be applied to other spiral separators such as those described in Australian Patent Specification No. 69436/81 which includes an initial narrow and deep channel in a top part of a spiral separator which becomes progressively wider so as to enable the particles to obtain or maintain an appropriate speed or initial velocity.

Preferably the second part of the inner portion is maintained at a constant angle to horizontal when compared to the first part which has a horizontal angle which progressively decreases from top to bottom. The outer portion suitably comprises a vertically inclined side wall of each helical turn of the spiral separator which suitably has a height substantially less than the length of the bottom wall of each helical turn. For example the vertical side wall may have a height of 15 to 40% of the length of the bottom wall and more preferably 20 to $33\frac{1}{3}$ of the length of the bottom wall.

Figure 6:
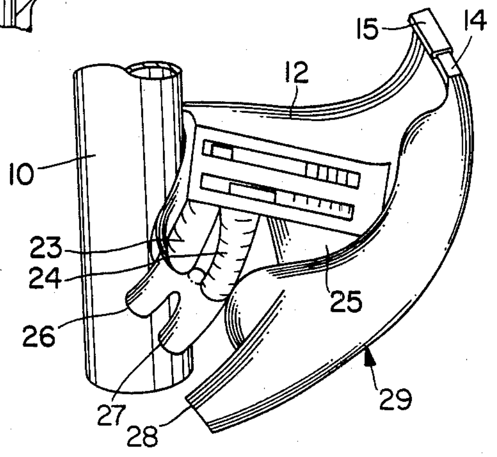

In order that a preferred embodiment of the invention may be readily understood and carried into practical effect, reference is now made to the accompanying drawings, wherein:

FIG. 1 is a side elevational view of a spiral separator according to the invention;

FIGS. 2, 3, 4 and 5 are cross-sectional views, to larger scale, of one of the spirals of the separator shown in FIG. 1, and taken, respectively, along lines 2—2, 3—3, 4—4 and 5—5 in FIG. 1 and;

FIG. 6 is a plan view of the bottom end of one of the spirals of the separator.

The separator shown in the drawings includes a central vertical tubular column 10. Three identical helical sluices or spirals 11 each of five complete turns, are mounted coaxially on the central column 10. Each of the spirals may be molded as an integral unit, of fiberglass or other suitable material. Each spiral has a bottom wall 12 of which a first part 12A in cross-section, is substantially straight, inclining upwards from the inside to the outside of the spiral at an angle A, as indicated in FIGS. 2, 3, 4 and 5. This inner part 12A of the bottom wall 12 nearest the axis of the spiral, has a fairly short upward curve 12C to meet the column 10. There is also included a second part 12B of bottom wall 12 which leads up through a small-radius curve to the nearly vertical outside wall 13 of the separator. The outside wall 13 is formed, at the top, with an outwardly projecting rim 14, over which there is fitted closely and secured an extruded flexible cover strip 15 made of a suitable plastics material.

Figure 2:
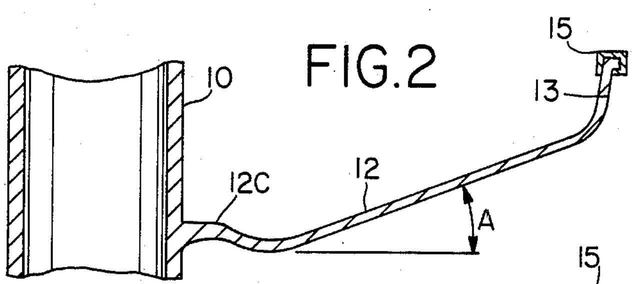
Figure 3:
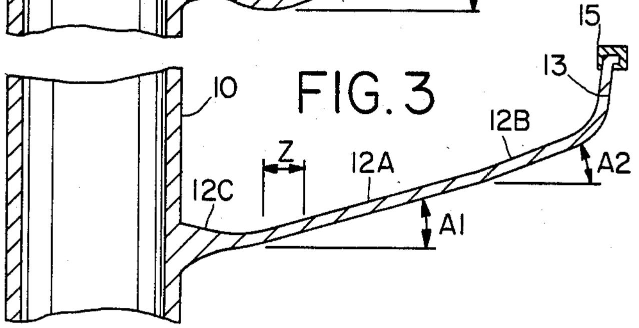
Figure 4:
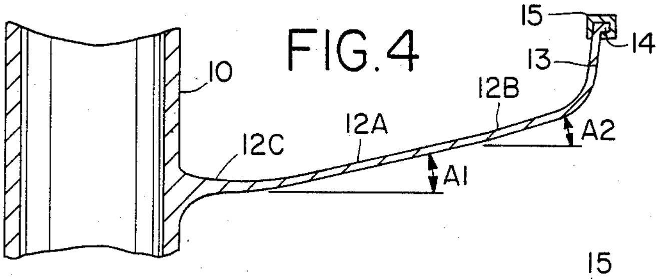
Figure 5:
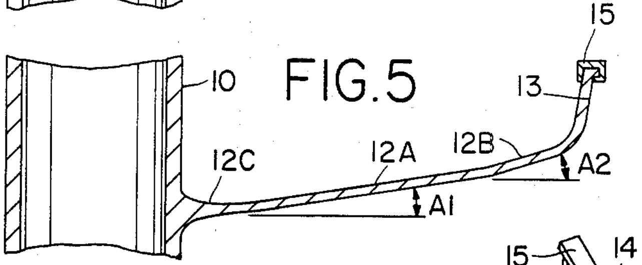

The pitch of the outside part of the spiral is uniform, but the cross-sectional angle A1 of the spiral bottom 12 to horizontal varies and consequently the pitch of the inside part of the spiral is varied. In the first two complete turns of each spiral, this angle A as indicated in FIG. 2, is about 21°. Below these two upper turns, the angle A1 of the spiral bottom to horizontal is reduced to about 15° in the third turn as indicated in FIG. 3. This spiral bottom angle A1 is further reduced to about 12° in the fourth turn, as shown in FIG. 4, and is further reduced again to about 9°, for the fifth and final turn of the spiral. In each case, the reduction of the angle A1 is not abrupt but the change is made gradually, through about a third of a turn.

In contrast the angle to the horizontal angle A2 of outer part 12B is substantially constant, being 21° throughout the length of the spiral.

The uppermost part of each of the spirals 11 is covered by a top plate 16, through which a tubular pulp inlet 17 leads to the top part of the spiral. The three spirals are so mounted on the central column 10 that the pulp inlets 17 are about as close as is practical, to facilitate the simultaneous feed of pulp to all three.

In the lowermost part of each of the spirals (FIG. 6) there is provided an off take assembly 29. Downstream of the off take assembly 29 the spiral bottom is shaped to form a concentrates channel 23, a middlings channel 24 and a tailings channel 25. The three channels 23, 24 and 25 develop into tubular passages to which are connected, respectively, a concentrates hose 26, a middlings hose 27 and a tailings hose 28, each leading down to an appropriate receptacle (not shown).

In use, the pulp of water and solids to be separated into, for example, mineral sands and silica sands, is fed simultaneously into the pump inlets 17 of the three spirals 11. Within the uppermost turns of the spirals, the mineral sands, of fairly high specific gravity, tend to move down across the steeply sloping bottom 12 of each of the spirals towards the central column 10, where the angle of descent is very steep, and at the same time, the less dense silica sands tend to move centrifugally outwards towards the outer wall 13 of the spiral. The reduction of the spiral bottom angle A1 in the third turn of each spiral in relation to bottom wall inner part 12A exercises a braking effect on the flow of the material particularly on flow of the material near to the inside of the spiral, where the change in pitch and of the gradient of descent of the material is most pronounced. Consequently there is a spreading of the innermost stratum of the pulp which appear to facilitate the separation cut from this stratum of fine silica particles which otherwise are likely to remain locked into the flow of concentrated mineral sands. Between the innermost stratum of fairly concentrated mineral sands and the outer stratum mainly of silica sands there becomes apparent a zone known as a "flick zone", indicated at Z in FIG. 3 and characterized by rapidly recurring outward surges of sand, more or less tangential to the inner most stratum of mainly high density mineral sand. It appears that a substantial amount of separation of the mineral and silica sand occurs in this flick zone, which with many materials is more shallow than the concentrate stratum inwardly of it, or the tailings stratum outwardly of it, the silica sand separating centrifugally outwards and generally above the inwardly moving denser mineral sands. This phenomenon is more fully described in Australian Specification No. 55205/80.

The flow of the pulp is further braked in the fourth turn of the spiral, with the reduction in the pitch of its inner part 12A consequent in the further reduction of the angle A1.

The presence of outer part 12B by providing a steeper horizontal angle A2 that A1 causes clean water to flow around part 12B and adjacent side wall 13 because turbulent flow of pulp along part 12A is substantially eliminated. This enables efficient separation of concentrates from middlings and tailings as clearly defined stratification zones are produced. Also due to the angle of outer part 12B there is no tendency for the sand to become stationary causing the familiar "sand barring" problem. This also makes it possible to use a higher feed rate (e.g. 3.5–4.0 tons of solids dry weight per hour per start) when compared to a more normal feed rate (e.g. 1.5–2.5 tons of solids dry weight per hour per start).

Also, the reduced height of vertical outer portion side wall 13 (i.e. it is about 20% of the length of upwardly sloping bottom wall 12) enables a greater number of spiral separators to be attached to a common central column. Thus in the illustrated embodiment four separators may be attached to central column 10 compared to two in the case of a high vertical side wall as described in Patent Specification No. 64936/81.

I claim:

1. A spiral separator supported with its axis substantially vertically which is adapted to receive at an upper end thereof a pulp of water and minerals to be separated, said spiral separator including a plurality of helical turns wherein each turn includes an inner bottom wall portion and an outer portion with the outer portion being inclined upwardly relative to the inner portion and characterized in that said inner portion includes a first inner part and a second outer part whereby said second outer part is inclined upwardly relative to the first inner part at a steeper angle to horizontal than said first inner part throughout part of the length of the spiral separator whereby generally non-turbulent or laminar flow of pulp is achieved along said part of the length of the spiral separator and sand barring is inhibited.

2. A spiral separator as claimed in claim 1 wherein the second outer part is maintained substantially at a constant angle to horizontal throughout said part of the length of the spiral separator.

3. A spiral separator as claimed in claim 1 or 2 wherein the first inner part has an angle to horizontal which progressively decreases from top to bottom of said part of the length of the spiral separator.

4. A spiral separator as claimed in claim 3 wherein the first part has an angle to horizontal which progressively decreases from 21° to 9°.

5. A spiral separator as claimed in claim 3 wherein the height of said outer portion is substantially less than the radial length of said bottom wall throughout the said part of the length of the spiral separator.

6. A spiral separator as claimed in claim 5 wherein the height of the outer portion is from 15–40% the length of said bottom wall.

7. A spiral separator as claimed in claim 6 wherein the first part has an angle to horizontal which progressively decreases from 21° to 9°.

8. A spiral separator as claimed in claim 5 wherein the height of the outer portion is from 20–33⅓% of the length of said bottom wall.

9. A spiral separator as claimed in claim 8 wherein the first part has an angle to horizontal which progressively decreases from 21° to 9°.

10. A spiral separator as claimed in claim 5 wherein the first part has an angle to horizontal which progressively decreases from 21° to 9°.

11. A sprial separator as claimed in claim 1 or 2 wherein the height of said outer portion is substantially less than the radial length of said bottom wall throughout the said part of the length of the spiral separator.

12. A spiral separator as claimed in claim 11 wherein the first part has an angle to horizontal which progressively decreases from 21° to 9°.

13. A spiral separator as claimed in claim 11 wherein the height of the outer portion is from 15–40% the length of said bottom wall.

14. A spiral separator as claimed in claim 13 wherein the first part has an angle to horizontal which progressively decreases from 21° to 9.

15. A spiral separator as claimed in claim 11 wherein the height of the outer portion is from 20–33⅓% of the length of said bottom wall.

16. A spiral separator as claimed in claim 15 wherein the first part has an angle to horizontal which progressively decreases from 21° to 9°.

* * * * *